March 26, 1968
D. H. MAGES
3,374,700
BUTT CUTTING ROLL WITH REMOVABLE BLADE AND PRESS FIT
GUIDE BEARINGS AND METHOD OF MAKING SAME
Filed Oct. 21, 1965
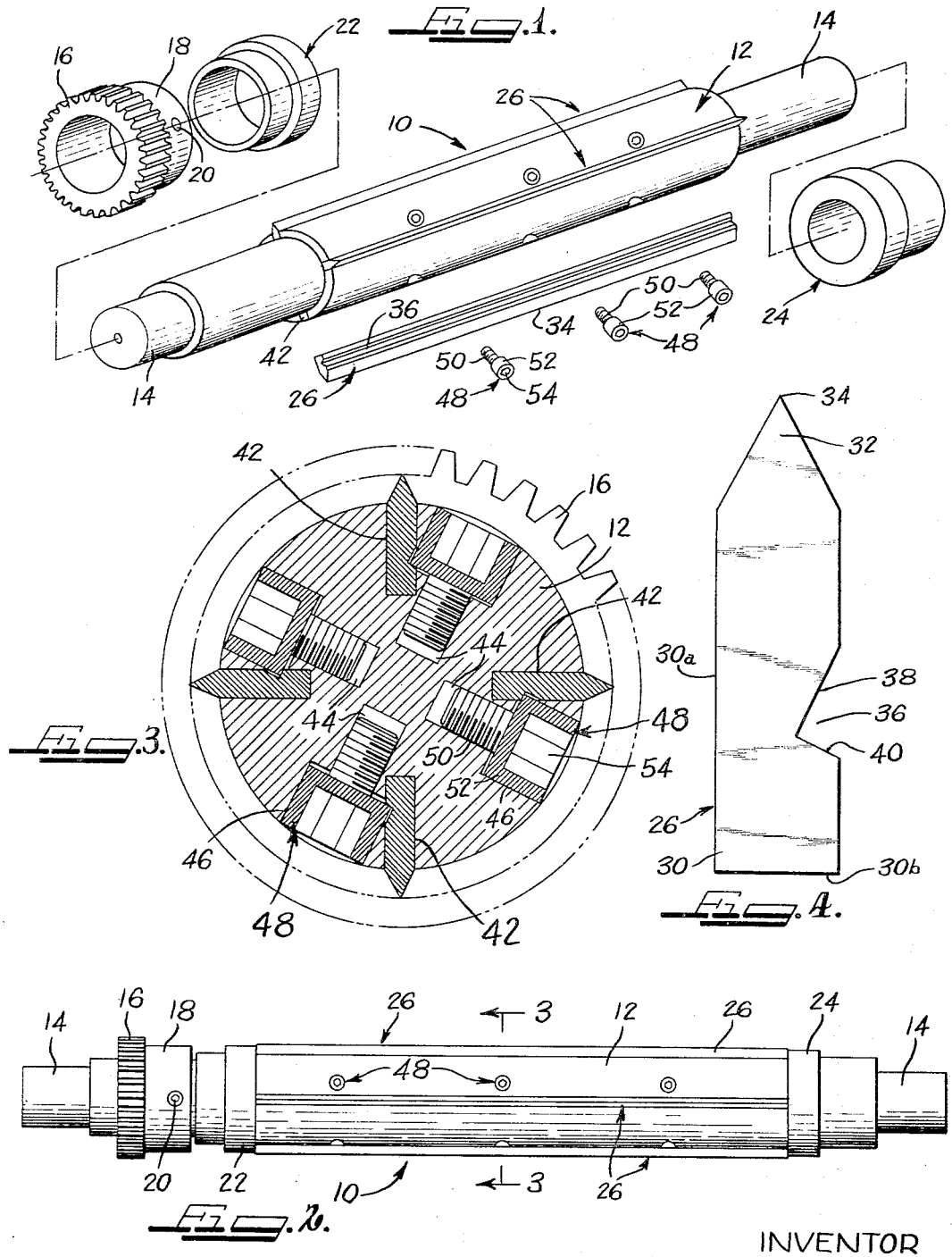
INVENTOR
DAVID H. MAGES
BY
Bair, Freeman & Molinare
Attys.

United States Patent Office 3,374,700
Patented Mar. 26, 1968

3,374,700
BUTT CUTTING ROLL WITH REMOVABLE BLADE AND PRESS FIT GUIDE BEARINGS AND METHOD OF MAKING SAME
David H. Mages, Chicago, Ill., assignor to Webtron Corporation, a corporation of Illinois
Filed Oct. 21, 1965, Ser. No. 500,430
5 Claims. (Cl. 83—674)

ABSTRACT OF THE DISCLOSURE

An efficient butt-type cutting tool is constructed from a roller body of inexpensive, round bar stock that is longitudinally grooved radially to a depth defined at a precise distance from the point on the body selected as the center of the finished tool. Rings of hardened material are press fit into the bar stock and ground to a periphery concentric with the selected center of the tool, and an accurately formed cutter blade is removably but rigidly secured in the tool's groove to provide a precision tool.

---

This invention relates to a butt cutting tool and more particularly to an improved butt cutting tool with a removable blade therefor.

In the machine handling of continuous webs of material, such as a web of paper, it is frequently desirable that a means be provided for severing the web into segments along lines that run transversely to the direction of movement of the web. Heretofore, it has been the practice to provide a roller, whose periphery is accurately controlled, with an engraved blade means integrally thereon, which will cooperate with a moving web to effect severing or partial severing of the web at predetermined intervals along lines transverse to the direction of movement of the web. Such a roller with severing blade means thereon for cutting transverse to the direction of movement of the web is known as a butt cutting tool, or when only partial severing takes place, it is referred to as a butt-type perforator.

The problem with such prior butt cutting tools are twofold. First, a separate, expensively constructed tool is required for each different length of spacing that is required between successive butt cuts. Second, the cost of production of such a tool by engraving techniques is high because the roller from which the blade is to be formed is required to be of the same high grade material as that required for the severing blade.

Thus, one object of this invention is to provide an improved butt cutting tool that utilizes removable blades thereon, and which is characterized by inexpensiveness and simplicity of construction and by its flexibility and versatility of use in providing a range of optional spacings for butt cuts that may be achieved with a single tool.

Another object of this invention is to provide a butt cutting tool with removable blades thereon, which tool is so constructed that the cutting blades thereof may be quickly and easily assembled or disassembled and wherein simple but effective means are provided for rigidly holding the blades accurately assembled on the tool.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawings, in which:

FIG. 1 is an exploded perspective view of a butt cutting tool constructed in accord with this invention;

FIG. 2 is a side elevational view of the assembled tool of FIG. 1;

FIG. 3 is an enlarged cross-sectional view taken on line 3—3 of FIG. 2; and

FIG. 4 is an enlarged elevational view of an end of the cutting blade used in the tool of FIGS. 1 and 3.

Referring now to the drawings, there is shown in FIGS. 1 and 2 a butt-cutting tool generally indicated at 10 which has been constructed in accordance with the invention described herein. The butt-cutting tool 10 including an elongated roller 12 that is formed of inexpensive round bar stock. Extending outwardly of the ends of the roller 12 is a mounting shaft means, or journal stubs, 14 adapted to be received in bearings that are to be carried on a frame (not shown).

Mounted on one of the journal stubs 14 is a gear 16 that has attached thereto a collar 18 which provides for retaining the gear in position on the shaft 14 by means of one or more set screws 20. The gear 16 affords means for a driving connection with another rotating part. Also provided on roller 12 are a pair of guide bearings 22 and 24, each of which has a very accurately machined, exterior cylindrical periphery, and which guide surfaces 22 and 24 are adapted to engage similar surfaces on an opposing roller for the purpose of precise spacing of the opposed rollers.

In the assembled butt-cutting tool 10, one or more butt-cutting blades 26 is provided on the roller body 12. Each cutting blade 26 is an elongated strip of hardened steel that is shaped to define, as best seen in FIG. 4, a shank portion 30 and a centrally peaked outer cutting portion 32, that terminates at a sharpened cutting edge 34. One side of the shank 30 has been cut into, or formed, to define an elongated notch 36 that is defined by an inclined relief wall 38 and an inclined abutment wall 40, with the said walls 38 and 40 positioned substantially at right angles to each other, as can best be seen in FIG. 1. The notch 36 extends along the entire length of the cutting blade 26.

As can best be seen in FIG. 3, the roller body 12 is provided with a plurality of longitudinal slot means 42 that are accurately milled and which extend radially of the center of the roller body 12. While the slots 42 are shown formed in the body 12, it is understood that the slot means for receiving the blades may be built up by any other appropriate means such as by provision of a hub with elements mounted thereon to define the side walls of the slots. The angular displacement of the slot means 42 relative to each other, about the center of roller 12, may be selected for any special design of spacing of the tips of the cutting blades from each other, but, in the instant example it is intended that the butt-cutting tool be of a design to provide for an accurate circumferential length defined by the tip of one cutting tool which is a pre-selected precise distance; and the arrangement of the additional slot means 42 is such that cutting blades may be inserted in the tool to provide cuts at each quarter of the total effective peripheral length of the cutting tool.

The roller body 12 is also provided with a plurality of bores 44 whose axes are angularly offset relative to the radial axes of the adjacent slot means 42, but with the axes of the bores 44 inclined relative to the plane of each adjacent slot means. In the preferred form, as can be seen in FIG. 3, the bore 44 does not intersect any portion of the slot means 42. However, a portion of each bore communicates at its outer end with an enlarged bore portion or recess 46 that is adapted to receive thereinto the socketed head of a cap screw 48. At least a portion of bore 44 is tapped to screwingly receive the threaded stem, or shank, 50 of a cap screw 49, while the head 52 of the cap screw is arranged to cooperate with the blade 26. The capscrew is also provided with hex socket 54 for receiving a tool therein.

The close relationship of the bores 44 to the slots 42 is such that each enlarged portion, or recess, 46 intersects the adjacent slot means 42, and at a precise position such that the head 52 of the cap screw will project into its adjacent slot 42 a sufficient distance to have the underside of the head 52 engage and bear against the abutment wall 40 formed on the shank of the cutting blade 26. The inclined relief wall 38 accommodates entry of the bearing portion of the screw member, in this instance the head 52 of the cap screw, and the only engagement between head 52 and cutting-blade 26 is through the engagement of the head with the abutment wall 40.

The size of the milled slot means 42 and the size of the blade 26 are so selected, and the arrangement of the cap screws 48 are so selected, that when the head 52 of the cap screw engages the abutment wall 40 on the cutting blade 26, the cap screw operates as a clamp member to rigidly clamp the blade 26 in position in its slot 42, and with the innermost walls 30a and 30b of the shank of the blade 26 clamped against the abutment walls of slot 42 to precisely locate the cutting blade relative to the slot 42. FIG. 1 illustrates that three spaced cap screws 49 are utilized to retain each blade 26 in its slot. It will be understood that more or less screws 49 may be used as each installation requires.

The foregoing construction provides the basis of a very economic method of forming a butt-cutting tool, without having to make each portion thereof of precise dimensions. Thus, the method used in forming the butt-cutting tool of this invention comprises providing a roller body of an inexpensive round bar stock of relatively soft steel, and then selecting the approximate center of the roller body as the axis of the tool. The bar stock may then be worked or machined to provide the journal stubs 14 coaxial of the selected approximate center of the roller body, and the slots 42 may be milled in roller body 12 to a depth that is a precise distance from the said selected center of the cutter body. The tapped bores 14 and recesses may also be formed to a precise dimensional spacing relative to the selected center. Thereafter, a pair of rings of a hardened material are pressed-fit onto the roller body 12 and these later serve as the guide bearings 22 and 24 for the tool. Since the roller body may actually be slightly off-center relative to the selected approximate center thereof, all that is necessary is to then grind down the hardened rings 22 and 24 to achieve precisely cylindrical surfaces thereon that are located concentric with the selected approximate center of the roller body.

The blades 26 are accurately formed in their dimensions, so that since the inner surfaces of the slots 42 are a precise distance from the selected center of the roller body, the cutting edges 34 will likewise be located a precise distance from the center of the roller body, regardless of whether the selected center of the roller body is the true geometrical center of the bar stock.

Thus, the method of fabrication and structure as herein defined provide means for forming a very inexpensive butt-cutting tool, since the forming thereof is relatively inexpensive. Furthermore, the butt-cutting tool herein has great flexibility because of the presence of removable blades which permits of the insertion of one or more blades, as desired, so that the length of the web-section that would be cut by the butt-cutting tool would be either the entire effective peripheral length of the butt-cutting tool, or a fraction thereof, depending upon how many blades are inserted into the tool. The use of the socketed cap screws 48 provides means for very rigidly holding the cutting blades in the tool, while the cost of the parts that are necessary to achieve the end product is relatively inexpensive.

While I have disclosed use of fairly large retaining cap screws 49 for rigidly holding the blades 26 in position on the roller 12, it will be appreciated that smaller headless retaining screws could be used in an arrangement where the inner tip of such retaining screws are caused to engage the abutment wall 40 on the blade 26.

While the blade 26 has been shown and described as having uninterrupted cutting edge 34, it will be understood that the cutting edge 34 may be interrupted or discontinuous to provide a perforated-type cut rather than a full length cut. The tool is then a butt-type perforator rather than a butt-cutting tool.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new and desire to secure by Letters Patent of the United States is:

1. In a butt-type cutting tool of the type wherein a cutting blade is rigidly held on a roller, the improvement comprising, in combination, elongated roller means having at least one elongated blade-receiving slot means formed thereon which extends longitudinally of the roller means and radially of the center of the roller means, an elongated blade removably but rigidly mounted on said roller means and providing a shank portion and a sharpened cutting edge, the blade having its shank of such a length relative to the depth of the slot means that with the shank inserted and rigidly held in said slot means the said cutting edge projects radially outwardly of the periphery of the roller means and a pre-selected distance from the axis of the roller means, screw-type clamp means carried by the roller means for removably clamping the blade in position on the roller means, the roller means including an elongated body of ordinary round bar stock without a precision formed periphery, a pair of hardened metal rings press fit onto said elongated body adjacent the ends of the body and serving as guide bearings for the roller means, and the periphery of said hardened metal rings being shaped to identical precise peripheries located radially inwardly of the cutting edge of the blade.

2. A device as in claim 1 wherein the shank portion of the blade is formed with a notch in one side thereof to provide an elongated inclined abutment wall, and the screw-type clamp means for removably clamping the blade on the roller means including a plurality of spaced radial bores in said roller means adjacent to said slot means but inclined relative to the plane of said slot means, each of said bores having at least a portion thereof that is tapped, the tapped portion of the bores being spaced from the slot means, each bore also having an enlarged portion intersecting a portion of the wall of the slot means, and a screw-type member screwed in each tapped bore and providing that a portion thereof enters into the adjacent slot means to enter the notch in said blade and to rigidly engage the inclined abutment wall to clamp the blade in position in said slot means.

3. A device as in claim 1 wherein the shank portion of the blade is formed with a notch in one side thereof, and the screw-type clamp means for removably clamping the blade on the roller means includes a plurality of spaced radial bores in said roller adjacent to said slot means but inclined relative to the plane of said slot means, each of said bores having at least a portion thereof that is tapped and is spaced from the adjacent slot means, an enlarged recess in alignment with each said tapped bore and intersecting a portion of the wall of the slot means, and a cap screw screwed in each tapped bore with its head only entering said enlarged recess and projecting into the adjacent slot to enter the notch in said blade and to rigidly clamp the blade in position in said slot.

4. A device as in claim 3 wherein the depth of the enlarged recess is selected to accommodate entry of the entire cap of the head screw thereinto.

5. A method of forming a butt-type cutting tool that carries at least one removable cutting blade, said method comprising the steps of: providing a roller body of inexpensive round bar stock; selecting the approximate center of the roller body as the axis of the tool; milling at least one elongated, radially disposed slot therein to a depth that is a precise distance from the selected center of the roller body; press fitting rings of hardened material onto the roller body to serve as guide bearings for the tool; grinding down the hardened guide bearing rings to a precise radial spacing from the selected center of the roller body; and then securing a cutting blade in said slot in the roller.

References Cited
UNITED STATES PATENTS 1,730,449  10/1929  Campbell _____ 83—698 X ANDREW R. JUHASZ, *Primary Examiner.*